United States Patent [19]
Demirors et al.

[11] Patent Number: 5,959,033
[45] Date of Patent: Sep. 28, 1999

[54] POLYMERS CONTAINING HIGHLY GRAFTED RUBBERS

[75] Inventors: Mehmet Demirors; Duane B. Priddy, both of Midland, Mich.; Nicolaas M. A. Hermans; Rudi H. E. Veraart, both of Terneuzen, Netherlands; Albert J. Heuvelsland, Heikant, Netherlands; Kevin D. Sikkema, Midland, Mich.

[73] Assignee: The Dow Chemical Company, Midland, Mich.

[21] Appl. No.: 08/993,553

[22] Filed: Dec. 18, 1997

Related U.S. Application Data

[60] Provisional application No. 60/035,845, Jan. 24, 1997.

[51] Int. Cl.$^6$ ...................................................... C08L 51/04
[52] U.S. Cl. ............................... 525/86; 525/70; 525/316
[58] Field of Search ................................ 525/86, 70, 316

[56] References Cited

U.S. PATENT DOCUMENTS

| | | | |
|---|---|---|---|
| 4,717,741 | 1/1988 | Hahnfeld et al. | 525/75 |
| 4,876,312 | 10/1989 | Meister et al. | 525/316 |
| 4,895,907 | 1/1990 | Priddy et al. | 525/257 |
| 5,075,347 | 12/1991 | Platt et al. | 525/315 |
| 5,414,045 | 5/1995 | Sue et al. | 525/316 |
| 5,569,709 | 10/1996 | Sue et al. | 525/316 |

FOREIGN PATENT DOCUMENTS

0810242 A2  12/1997  European Pat. Off. .

OTHER PUBLICATIONS

F. M. Peng, Journal Appl. Polym. Scie., "Polybutadiene Hydroperoxide by Singlet Oxygen", (1986), vol. 31, Issue 6, pp. 1827–1842.

Chemical Abstract, 105:7210.

*Primary Examiner*—James J. Seidleck
*Assistant Examiner*—Olga Asinovsky

[57] ABSTRACT

The present invention is directed to rubber modified polymers which contain a non-block grafted rubber having a degree of grafting of at least 30 percent at the point of phase inversion and a specified amount of grafted vinyl aromatic polymer.

25 Claims, No Drawings

POLYMERS CONTAINING HIGHLY GRAFTED RUBBERS

CROSS-REFERENCE STATEMENT

This application claims the benefit of U.S. Provisional Application No. 60/035,845, filed Jan. 24, 1997.

BACKGROUND OF THE INVENTION

This invention relates to highly grafted rubbers and rubber modified polymers produced therefrom.

Rubber modified polymers such as high impact polystyrene (HIPS) and acrylonitrile/butadiene/styrene (ABS) are typically produced by polymerizing styrene or styrene/acrylonitrile in the presence of a dissolved rubber, such that the rubber is dispersed within the polymer matrix in the form of discrete rubber particles containing occluded matrix polymer therein. The occluded rubber particles can have a variety of morphologies including lamellar (onion skin), cellular (multiple occlusions), and core shell (single occlusion). Rubber particles having small size cellular and core shell morphology are particularly advantageous in enhancing the balance of gloss and impact strength properties of the rubber modified polymer. Additionally, the physical properties of the rubber modified polymers can be enhanced with increased levels of grafting on the rubber.

Block copolymer rubbers can be highly grafted and have been used in previous rubber modified polymers. However, block copolymer rubbers are more expensive than non-block versions making this method economically unattractive.

There have been many attempts to increase the level of grafting on non-block rubbers. One approach includes hydroperoxidation of a rubber using singlet oxygen (SO) which results in an added number of reactive grafting sites on the rubber backbone. Generation of SO photochemically in a rubber/styrene mixture containing dissolved oxygen has been reported in U.S. Pat. No. 4,717,741 by Hahnfeld et al. However, the number of reactive grafting sites obtained is limited by the solubility of oxygen in the rubber/styrene mixture. Additionally, photosensitizers must be used which act as contaminants in the final polymer, causing discoloration. Additionally, solubilizers are used for the photosensitizer which end up in the recycle stream and must be separated from the styrene monomer, making this process economically unattractive.

Another approach involves generating SO in a rubber/styrene mixture by heating a compound which releases SO, such as bisquinone peroxide as described in U.S. Pat. No. 4,895,907 by Priddy et al. However, relatively low levels of grafting were achieved and bisquinone peroxides are not available for commercial use.

Yet another approach involves generating singlet oxygen from triphenylphosphite ozonides to increase the grafting onto a polybutadiene rubber for the preparation of polybutadiene-modified polystyrene, as disclosed in "Polybutadiene Hydroperoxide by Singlet Oxygen: Its Grafting and Morphology in Polystyrene Matrix", Journal of Applied Polymer Science, Vol. 31, 1827–1842 (1986) by Peng. However, the process described does not achieve high levels of grafting as hypothesized by Peng.

Therefore, it remains highly desirable to obtain rubber modified vinyl aromatic polymers containing highly grafted non-block rubber particles using an efficient and commercially viable process.

SUMMARY OF THE INVENTION

In one aspect the present invention is a rubber modified polymer comprising a) a vinyl aromatic polymer matrix, and
b) a non-block grafted rubber having a degree of grafting of from 30 to 100 percent at the point of phase inversion, wherein the total amount of grafted vinyl aromatic polymer is from 20 to 75 percent of the total amount of vinyl aromatic polymer, wherein the grafted rubber is dispersed within the vinyl aromatic polymer matrix in the form of discrete rubber particles containing occluded matrix polymer therein.

This rubber modified vinyl aromatic polymer containing a highly grafted non-block rubber combined with the defined graft/matrix ratio has enhanced physical properties and economic advantage when compared to rubber modified vinyl aromatic polymers containing rubbers of the current art.

Another aspect of the present invention is a transparent rubber modified vinyl aromatic polymer wherein the dispersed rubber is in the form of dense particles containing substantially no occluded matrix polymer therein, having an average particle size of less than $0.1\mu$.

This rubber modified vinyl aromatic polymer can be used to produce transparent films.

Another aspect of the present invention is a rubber modified polymer comprising a) a vinyl aromatic and unsaturated nitrile copolymer matrix, and
b) a non-block grafted rubber having a degree of grafting of from 30 to 100 percent prior to phase inversion, wherein the total amount of grafted vinyl aromatic and unsaturated nitrile copolymer is from 25 to 90 percent of the total amount of vinyl aromatic and unsaturated nitrile copolymer, such that the rubber is dispersed within the polymer matrix in the form of rubber particles.

This rubber modified vinyl aromatic/unsaturated nitrile polymer containing a highly grafted non-block rubber combined with the defined graft/matrix polymer ratio has enhanced physical properties when compared to rubber modified vinyl aromatic/unsaturated nitrile polymers containing rubbers of the current art.

Yet another aspect of the present invention is a rubber modified vinylaromatic/unsaturated nitrile polymer containing highly grafted rubber produced using a mass polymerization process, wherein the polymer comprises a) a vinyl aromatic and unsaturated nitrile copolymer matrix, and
b) a grafted rubber having a degree of grafting of from 30 to 100 percent prior to phase inversion, wherein the total amount of grafted vinyl aromatic and unsaturated nitrile copolymer is from 25 to 90 percent of the total amount of vinyl aromatic and unsaturated nitrile copolymer, such that the rubber is dispersed within the polymer matrix in the form of rubber particles.

This rubber modified vinyl aromatic/unsaturated nitrile polymer produced by a mass process is similar in characteristics to a rubber modified vinyl aromatic/unsaturated nitrile polymer produced using an emulsion polymerization process, having excellent gloss and impact strength properties.

Yet another aspect of the present invention is an improvement in a mass process for producing a rubber modified vinyl aromatic polymer wherein the improvement comprises producing grafting sites on a non-block rubber during polymerization of a vinyl aromatic monomer, such that at least 25 percent of the rubber is grafted with vinyl aromatic polymer at the point of phase inversion.

This process allows for the production of rubber modified vinyl aromatic polymers containing highly grafted non-block rubbers which enhance the physical properties of the rubber modified polymer produced.

DESCRIPTION OF THE PREFERRED EMBODIMENTS

The rubber modified polymers of the present invention comprise a matrix polymer, a grafted non-block rubber and a grafting polymer. The grafting polymer is grafted to the rubber, which is dispersed throughout the matrix polymer in the form of rubber particles.

The matrix polymer can be any polymer produced from a vinyl aromatic monomer. Suitable vinyl aromatic monomers include, but are not limited to, those vinyl aromatic monomers known for use in polymerization processes, such as those described in U.S. Pat. Nos. 4,666,987, 4,572,819 and 4,585,825, which are herein incorporated by reference. Preferably, the monomer is of the formula:

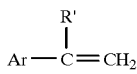

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. Impact modified, or grafted rubber containing products are additionally described in U.S. Pat. Nos. 3,123,655, 3,346,520, 3,639,522, and 4,409,369, which are incorporated by reference herein.

The weight average molecular weight (Mw) of the matrix polymer is typically 50,000 to 500,000, preferably 60,000 to 400,000 and most preferably 80,000 to 350,000.

The grafted non-block rubber comprises a non-block rubber substrate containing grafts of the grafting polymer. The rubber substrate can be any unsaturated non-block rubbery polymer having a glass transition temperature of not higher than 0°C., preferably not higher than −20° C., as determined by ASTM D-756-52T. Typically, the rubber can be any non-block rubber which has unsaturated bonds of at least 0.1 percent or more in the rubber backbone. The term non-block rubber refers to a rubber wherein substantially no blocks exist within the rubber backbone and the rubber is substantially a homopolymer or copolymer containing 10 percent or less of a block copolymer. Suitable rubbers include diene rubbers, butyl rubbers ethylenepropylene-diene monomer (EPDM) rubbers, and silicone rubbers. Examples of suitable diene rubbers include but are not limited to mixtures of one or more conjugated 1,3-dienes, e.g., butadiene, isoprene, piperylene, chloroprene, etc. Suitable rubbers also include homopolymers of conjugated 1,3-dienes and interpolymers of conjugated 1,3-dienes with one or more copolymerizable monoethylenically unsaturated monomers, e.g., copolymers of isobutylene and isoprene. Preferably, the rubber is a homopolymer of a 1,3-conjugated diene such as butadiene, isoprene, piperylene, chloroprene and the like, or a copolymer of a conjugated diene with one or more vinyl aromatic monomers such as styrene; alpha, beta-ethylenically unsaturated nitrites such as acrylonitrile; alpha-olefins such as ethylene or propylene, and the like. Other rubbers include branched rubbers and low solution viscosity rubbers containing vinyl aromatic polymer blocks. Most preferred rubbers are homopolymers of 1,3-butadiene. Small amounts of block copolymer rubbers can be combined with the highly grafted non-block rubbers used in the rubber modified polymers of the present invention.

The weight average molecular weight (Mw) of the rubber polymer is generally from 10,000 to 600,000, typically from 30,000 to 500,000, preferably from 40,000 to 400,000, more preferably from 45,000 to 400,000, and most preferably from 50,000 to 350,000 as measured by gel permeation chromatography (GPC).

The grafting polymer may be the same as or different from the matrix polymer. The grafting polymer can be produced from a variety of monomeric materials including vinyl aromatic monomers such as styrene, alpha-methylstyrene, 2,4-dimethylstyrene, 4-butylstyrene, etc.; ring substituted alkylstyrenes, e.g., ortho-, meta- and paravinyl toluene; ring-substituted halostyrene, vinyl naphthalene, vinyl anthracene, etc. Alkyl substituents generally have one to four carbon atoms and may include isopropyl and isobutyl groups. If desired, mixtures of one or more vinyl aromatic monomers may be used. Preferred monomers for use as the grafting polymer are styrene, acrylonitrile and methyl methacrylate. Also suitable for use in forming the grafting polymer are free-radically polymerizable olefinically unsaturated monomers. Examples of such monomers include methyl methacrylate, ethyl methacrylate, and the like; acrylonitrile, methacrylonitrile, ethacrylonitrile, and the like; and ethylene, propylene, and the like.

The Mw of the grafting polymer will depend upon the final polymer product desired. For example, in a polymer having dense particles containing substantially no occluded matrix polymer, the molecular weight of the grafting polymer will be as low as possible, preferably less than 300,000, more preferably less than 250,000, and most preferably less than 200,000. For products containing rubber particles having a core shell morphology, the Mw of the grafting polymer will be close to or equal to the Mw of the matrix polymer.

Typically the grafting polymer will have a Mw of about 20,000 to about 800,000, preferably from about 30,000 to about 700,000, more preferably from about 40,000 to about 600,000 and most preferably from about 50,000 to about 500,000.

If the matrix polymer and grafting polymer are different, they must be compatible. In other words, a mixture of the two polymers should have one glass transition temperature. A mixture of two incompatible polymers would have two distinctive glass transition temperatures corresponding to each individual polymer.

In one embodiment of the present invention, both the matrix polymer and grafting polymer are a copolymer of styrene and acrylonitrile and the rubber is a polybutadiene. In this embodiment the weight ratio of styrene to acrylonitrile varies from about 99:1 to about 60:40.

In another embodiment, both the matrix polymer and grafting polymer are polystyrene and the rubber is a polybutadiene.

The rubber is typically present in amounts such that the rubber modified polymer contains from about 2 to about 30, generally from about 4 to about 25, preferably from about 5 to about 20, and more preferably from about 8 to about 20 weight percent rubber, based on the total weight of the monomer and rubber components. The amount of rubber present is also dependent upon the final polymer product desired. Typically, for polymers such as HIPS, the amount of rubber is from about 5 to about 15 wt. percent. ABS polymers typically contain from about 5 to about 30 wt. percent rubber.

Another aspect of the present invention relates to an improved mass polymerization process for producing rubber modified vinyl aromatic polymers. In general, the rubber modified vinyl aromatic polymers of the present invention are produced by a continuous mass polymerization as described in U.S. Pat. No. 4,640,959, which is incorporated herein by reference, combined with a process of grafting such that at least a 25 percent, preferably at least a 30 percent degree of grafting is achieved at the point of phase inversion. It is noted that additional grafting may occur after phase inversion, wherein up to 10 or even 20 percent additional grafting may occur. Therefore, rubber modified vinyl aromatic polymers produced by this process would contain rubbers having at least a 35 percent, preferably at least 40 percent, and up to 100 percent degree of grafting.

The mass polymerization can be conducted in the presence of additives such as initiators, chain transfer agents, lubricants, etc. Typical initiators include peroxides such as t-butyl hydroperoxide, di-t-butyl peroxide, cumene hydroperoxide, dicumyl peroxide, 1,1-bis(t-butylperoxy) cyclohexane, benzoyl peroxide, 1,1-bis(4,4-di-t-butyl peroxy cyclohexane)propanone; and azo compounds such as azo-bis-isobutyrate and azo bis-cyanovaleric acid. Typical chain transfer agents include mercaptans such as n-dodecyl mercaptan and t-dodecyl mercaptan, alpha-methylstyrene dimer, 1-phenyl-butene-2-fluorene, terpinol, and chloroform. Other additives such as lubricants, e.g. stearic acid, behenic acid, stearoamidic acid; oxidation inhibitors, e.g. hindered phenols; plasticizers, e.g. mineral oil, polyethylene glycol; flame retarding agents, photo stabilizers, coloring agents, fiber reinforcing agents, fillers and the like can also be used.

Solvents may also be employed in the mass polymerization process. Typical solvents include aromatic hydrocarbons such as toluene, benzene, ethyl benzene, xylene, hydrocarbons such as heptane, hexane, octane and the like. Preferably ethyl benzene or toluene are employed. In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to about 35 weight percent, preferably from about 2 to about 25 weight percent, based on the total weight of the solution.

Preferably the mass polymerization is conducted in one or more substantially linear, stratified flow or so-called "plug flow" type reactors such as describe in U.S. Pat. No. 2,727,884 or alternatively, in a stirred tank reactor wherein the contents of the reactor are essentially uniform throughout, which stirred tank reactor is generally employed in combination with one or more "plug-flow" type reactors. The temperatures at which polymerization is most advantageously conducted are dependent on a variety of factors including the specific initiator, type and concentration of rubbers, and the co-monomer and reaction solvent, if any, employed. In general, polymerization temperatures range from 60 to 160° C. prior to phase inversion with temperatures from 100 to 190° C. being employed subsequent to phase inversion.

A process of grafting the rubber, such that at least a 25 percent, preferably at least a 30 percent degree of grafting is achieved at the point of phase inversion, is also utilized during the mass polymerization process. Degree of grafting refers to the ratio of grafted rubber to the total amount of rubber present. In other words if a rubber has at least a 30 percent degree of grafting, then at least 30 percent of the rubber contains at least one grafted chain of grafting polymer. The desired degree of grafting can be obtained through any process which produces the desired number of reactive sites on the rubber during the polymerization process prior to phase inversion. For example, the use of low viscosity rubbers combined with increased amounts of initiators, e.g. greater than 500 ppm (parts per million), can increase the level of grafting on the rubber to a desirable level. However, this method may also cause increased reactivity making the reaction difficult to control. In situ generation of singlet oxygen will also increase the level of grafting as desired. Generation of singlet oxygen within the mass polymerization can be accomplished by several methods which include but are not limited to decomposition of phosphite ozonides in the polymerization feed, generating singlet oxygen gas by combining chlorine and basic hydrogen peroxide and contacting with the polymerization feed, microwave discharge of dissolved oxygen in the polymer feed, or generating singlet oxygen gas by plasma discharge of oxygen and an inert gas and contacting with the polymerization feed.

In one embodiment of the process of the present invention, singlet oxygen is utilized to attain the desired degree of grafting on the rubber by decomposition of phosphite ozonides in the vinyl aromatic monomer and rubber feed of a mass polymerization process. Phosphite ozonides can be produced by dissolving a phosphite, e.g. triphenyl phosphite, in an organic solvent at a low temperature, typically below about −60° C., in the presence of an excess of ozone. Typical solvents include inert solvents such as toluene, ethyl benzene and the like. An excess of ozone refers to a greater concentration of ozone than the concentration of phosphite in the reaction mixture. It is important to have an excess of ozone present in order to increase the yield of phosphite ozonide at colder temperatures, such as −80° C., which is the typical temperature used in making phosphorous ozonides. It has been found that if phosphite is in excess it decomposes part of the ozonide, reducing the yield of the reaction.

Typical phosphite ozonides are known in the art and include but are not limited to those described by the general formula:

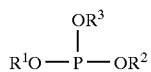

wherein $R^1$, $R^2{}_1$ and $R^3$ are $C_1$ to $C_{20}$ alkyl, aryl or combination of alkyl and aryl groups, wherein aryl groups may contain from 1 to 3 rings. These compounds can also be of cyclic type wherein the phosphorous atom is part of a mono, bicyclic or tricyclic structure.

The phosphite ozonide is advantageously cooled to a temperature less than −50° C., more preferably less than −60° C. and most preferably −80° C. or less, to slow the decomposition of the ozonide produced and increase the yield.

The rubber is typically dissolved in a mixture of a vinyl aromatic monomer and a solvent, such as ethyl benzene, prior to feeding to the mass polymerization process. The phosphite ozonide is added to the rubber solution under appropriate conditions for adequate distribution of the ozonide within the rubber solution. The rubber solution is typically maintained at room temperature, e.g. about 25° C., provided that the phosphite ozonide is mixed rapidly with the rubber solution. The rubber solution may also be cooled to a temperature of −25° C. or less to allow for good distribution of the phosphite ozonide in the rubber solution.

The phosphite ozonide produces singlet oxygen which reacts with the rubber to produce hydroperoxide groups on the rubber backbone. These hydroperoxide groups then serve as grafting sites on the rubber during polymerization of the vinyl aromatic monomer and rubber feed. The amount of singlet oxygen needed to achieve the desired grafting sites on the rubber is dependent upon the polymer product and degree of grafting desired. Polymers wherein a higher degree of grafting is desired, require a greater amount of singlet oxygen. In one embodiment wherein the singlet oxygen is generated from a phosphite ozonide, from 25 ppm to 1.0 wt. percent of singlet oxygen is typically required, based on the total weight of the polymerization feed. The amount of singlet oxygen required is determined by the requirements of grafting at the point of phase inversion. Typically less than half the singlet oxygen units added to the mass polymerization result as a graft site on the rubber.

Typically, to achieve a 30 percent degree of grafting or more, at least 50 ppm hydroperoxide units based on the weight of diene rubber in the polymerization feed is needed. Generally, from about 50, preferably from about 100, more preferably from about 150 and most preferably from about 200 to about 2000, preferably to about 1800, more preferably to about 1500 and most preferably to about 1200 ppm hydroperoxide units, based on the weight of the total rubber in the polymerization mixture, can be used.

In one embodiment of the present invention, a transparent high impact polystyrene polymer is produced containing particles having a volume average particle size of $0.1\mu$ or less. In this embodiment, at least 600 ppm, more preferably at least 1000 ppm or more hydroperoxide units based on the weight of the rubber in the solution are present on the rubber backbone.

In another embodiment of the present invention, ABS polymers are produced. In this embodiment, the ozonide concentration is typically from about 20 percent to about 30 percent lower than those required for HIPS products at a given rubber level. The efficiency of the grafting process is enhanced in such polymers due to the presence of polar components, e.g. acrylonitrile. Therefore, less ozonide is needed to achieve the same level of grafting in an ABS polymer than that needed in a HIPS polymer. In HIPS polymers, typically about 30 percent of the hydroperoxide units present result in a grafting site on the rubber, whereas about 50 percent results in grafting sites in ABS polymers.

The rubber modified vinyl aromatic polymers of the present invention contain a rubber dispersed throughout the vinyl aromatic polymer matrix in the form of particles which can have a variety of volume average particle sizes. Methods and conditions needed for producing a desired volume average particle size are well known to one skilled in the art. As used herein, the volume average particle size refers to the diameter of the rubber particles, including all occlusions of vinyl aromatic polymer within the rubber particles. Volume average particle sizes and distributions may be measured using conventional techniques such as a Coulter Counters or, transmission electron microscopy image analysis. Generally, the rubber particles obtained can vary from about 0.01 to about $5\mu$.

ABS polymers of the present invention can have volume average rubber particle sizes in the range of 0.01 to $1\mu$, preferably 0.05 to $0.9\mu$, and more preferably 0.05 to $0.8\mu$. Additionally, the rubber particles can have a variety of morphologies including lamellar, cellular and core shell. It has been surprisingly discovered that using the improved mass process of the present invention, ABS products can be obtained which closely resemble rubber modified ABS products obtained in an emulsion polymerization process. In particular, dense rubber particles and core shell morphology rubber particles can be obtained in an ABS polymer, which has not been accomplished previously, using the improved mass process of the present invention.

HIPS polymers of the present invention typically contain rubber particles having volume average particle sizes in the range of about 0.1 to about $5\mu$, more preferably from about 0.2 to $4\mu$, and most preferably from about 0.2 to a $3\mu$. Preferred morphologies include cellular, lamellar and core shell with core shell being most preferred.

Additionally, a transparent HIPS (TIPS) product can be obtained wherein the rubber particles are dense, having no occlusions of matrix polymer and are less than 0.1 $\mu$.

Another important aspect of the present invention, in addition to the degree of grafting, pertains to embodiments wherein the matrix polymer and grafting polymer are the same. This aspect is the ratio of grafted matrix polymer to the total amount of matrix polymer. In this case the amount of matrix polymer present as graft on the rubber is also dependent upon the degree of grafting desired on the final polymer product.

In one embodiment of the present invention, a HIPS polymer containing rubber particles having an average particle size of from 0.4 to $1\mu$ and a cellular morphology can be produced wherein the degree of grafting is advantageously from about 30 to 60 percent at the point of phase inversion. Phase inversion is a term well known in the art and refers to the process wherein the vinyl aromatic monomer polymerizes forming a discontinuous phase dispersed throughout a continuous phase of dissolved rubber in monomer. As the vinyl aromatic monomer continues to polymerize, the discontinuous polymer phase becomes larger in volume thus forming a continuous phase, while the rubber forms a discontinuous phase dispersed throughout. This phenomenon, referred to as "phase inversion", is, therefore, the conversion of the polymer from a discontinuous phase dispersed in the continuous phase of the rubber/monomer solution, through the point where there is no distinct continuous or discontinuous phase in the polymerization mixture, to a continuous polymer phase having the rubber dispersed throughout. The point of phase inversion can be defined by the following formula:

$$s = 2.5 \times R_w$$

wherein $R_w$ is the weight percent rubber based on the total polymerization mixture and a is the sum of rubber and polymer formed (both graft and free polymer matrix). Similarly the grafted matrix polymer to total matrix polymer ratio at the above solids content is advantageously in the range of from about 25 to about 50 percent. These ratios can be achieved by polymerizing the vinyl aromatic monomer with a rubber having from about 50 to about 2000 ppm of hydroperoxide units, based on the total amount of rubber, on the rubber backbone. Rubbers containing such levels of hydroperoxide units can be produced by mixing an appropriate amount of phosphite ozonide equal to about three times the stoichiometric amount of singlet oxygen needed. Due to its high reactivity, some, e.g. up to about two thirds, of the singlet oxygen is wasted by side reactions, leaving the remaining phosphorous ozonide to yield hydroperoxide units in the rubber backbone.

In another embodiment of the present invention, wherein a high impact polymer containing rubber particles having a core shell morphology and volume average particle size of 0.1 to 0.5μ is obtained, the degree of grafting is advantageously in the range of 40 to 80 percent and the ratio of matrix polymer grafted to total matrix polymer is 35 to 65 percent. These levels can be achieved by polymerizing vinyl aromatic monomer and rubber in the presence of an amount of phosphite ozonide which yields from 3 to 4 times the molar equivalent of singlet oxygen needed for the desired degree of grafting. Typically, from about 40 to about 200 ppm of singlet oxygen, based on the total feed weight, can be used, which would typically lead to 250 to 800 ppm hydroperoxide units, based on the weight of rubber, on the rubber backbone.

In embodiments wherein rubber particles having a core shell morphology are obtained, the polymerization is typically conducted in the presence of a chain transfer agent. Generally, at least 200 ppm of a chain transfer agent, e.g. n-dodecyl mercaptan, based on the total weight of the polymerization feed, is added at the beginning of the polymerization reaction, or prior to phase inversion, to obtain well defined core shell structures.

In another embodiment of the present invention wherein rubber particles of a volume average particle size of 0.1μ or less and having no occluded matrix polymer are obtained, the grafting level is advantageously from 50 to 100 percent at the point of phase inversion. The grafted matrix component at the point of phase inversion is advantageously 50 percent or more. The specific grafting parameters usually result from a rubber containing 600 ppm or higher levels of hydroperoxide units on the rubber backbone based on the weight of the rubber. These levels can be achieved by mixing a quantity of phosphite ozonide at a level sufficient to generate 100 ppm of singlet oxygen in a feed containing 5 percent by wt. of a low cis diene rubber. If a rubber containing more than typical cis content of 45 percent is used, the phosphite ozonide levels should be reduced as higher cis content rubbers usually lead to improved yields on hydroperoxidation.

If additional peroxide initiators are used in the polymerization process, the hydroperoxide content required to achieve the degree of grafting specific for any structure will decrease, as the activities of the hydroperoxide units on the rubber backbone and the grafting initiator are complementary.

The rubber modified vinyl aromatic polymers of the present invention can be used in a number of applications such as housings for small appliances, electronic equipment, office equipment and the like.

The improved mass polymerization process used to produce such polymers is an efficient and economically and commercially viable process to produce rubber modified vinyl aromatic polymers containing highly grafted rubbers and exhibiting enhanced physical properties.

The following examples are provided to illustrate the present invention. The examples are not intended to limit the scope of the present invention and they should not be so interpreted. Amounts are in weight parts or weight percentages unless otherwise indicated.

EXAMPLES

Ozonolysis of Triphenylphosphate

Triphenylphosphate (listed in TABLE I) is dissolved in 60 ml of methylene chloride. The solution is then cooled in a solid $CO_2$ bath to a temperature of approximately −78° C. Ozone gas is slowly bubbled through the solution using a ozonizer, Ozobloc™ OC1 (available from Envico Environment Control BV of the Netherlands). The reaction is considered complete once the blue color of dissolved ozone is observed consistently.

The ozonized triphenylphosphate solution is then mixed with the polymerization feed as listed in TABLE I which has been cooled to a temperature of approximately −20° C. using a cryostatic bath. This solution is mixed for approximately 30 minutes and then placed at room temperature to warm slowly for approximately 2 hours. During the warming process, the phosphorous ozonide decomposes to generate the singlet oxygen which in turn reacts with the polybutadiene of the feed to form the hydroperoxides on the rubber backbone.

The hydroperoxide content on the rubber backbone is then measured according to ASTM Method D-2340-82 by taking a small portion of the polymerization feed solution, precipitating the polybutadiene rubber using solvent precipitation, reacting with sodium iodide in isopropyl alcohol and titrating the liberated iodine with a standard solution of sodium thiosulfate.

Polymerization

The polymerization feed solution is then fed into a 2.5 liter Auger type batch reactor fitted with heating elements and an agitator. At the intervals specified in TABLE I, a sample is withdrawn from the reactor and analyzed for solids and grafting. Once the desired conversion level is reached, the polymerization syrup is then devolatilized in a vacuum oven at 240° C. for approximately one hour. The polymer is then ground and extruded into granules.

Physical Testing

Physical properties are determined from injection molded samples produced using an Arburg 170 injection molding machine.

Tensile testing is done according to ASTM D-638.

Izod Impact Testing is done according to ASTM D-256.

Charpy Impact testing is done according to ISO-179-2C.

Rubber Particle size is measured by a Coulter Counter Multisizer using a 20 micron tube.

Rubber Level in the final product is measured using IR Spectroscopy.

Gloss Measurements are determined using an Arburg All Rounder 170CM under the typical molding conditions listed below. Gardner (60 degree) measurements are done using a Dr. Lange device. Molding conditions and sample weight are maintained for comparison of materials.

| | |
|---|---|
| Mass temperature (° C.) | 230-220-210-190 |
| Mold temperature (° C.) | 40 |
| Injection Speed (cm³/min.) | 25 |
| Holding Pressure (bars) | 600 to 150 (in steps of 50) |
| Sample Weight (g) | 6.65 |

Graft measurements are done on reactor samples. For this purpose the well known solvent precipitation technique is used. The components are precipitated by changing the solubility parameter of the solvent gradually. Free polybutadiene(PBD), free polystyrene(PS) and polybutadiene-polystyrene graft copolymer (PBD-g-PS) weights are measured and grafted polybutadiene and grafted polystyrene are calculated.

Weight of Grafted Polystyrene=(Total PS wt.−((PBD-g-PS wt.+free PBD wt.)−total PBD wt.).

Weight of Grafted Polybutadiene=(PBD-g-PS wt.−Grafted PS wt.).

Percent Grafted Polystyrene=(Grafted PS wt./total PS wt.) ×100

Percent Grafted Polybutadiene=(Grafted PBD/Total PBD)×100.

TABLE I

| EXAMPLES | 1* | 2 | 3 | 4 |
|---|---|---|---|---|
| t-butylperoxy-benzoate (TBPB) (ppm) | 0 | 0 | 0 | 330 |
| Phosporous Ozonide (g) | 0 | 5.08 | 5.06 | 2.54 |
| Ozonide-conc. in MeCl Solution (ppm) (based on reaction mixture) | 0 | 100 | 100 | 57 |
| Measured Hydroperoxide Concentration on rubber (ppm) | 0 | 300 | 300 | 120 |
| Styrene (percent) | 88.5 | 88.5 | 88.5 | 88.5 |
| Polybutadiene (percent) | 5.55 | 5.55 | 5.55 | 5.55 |
| Ethylbenzene (percent) | 2.5 | 2.5 | 2.5 | 2.5 |
| Methylene Chloride (percent) | 2.5 | 2.5 | 2.5 | 2.5 |
| Mineral oil (percent) | 1 | 1 | 1 | 1 |
| Zinc stearate (percent) | 0.1 | 0.1 | 0.1 | 0.1 |
| n-Dodecyl mercaptan (NDM) (ppm) | 0 | 650 ppm added at t = 30 | 325 ppm added at t = 30 and at t = 180 | 650 ppm added at t = 30 |
| Percent Solids at time t = 15 minutes | 11 | 14 | 14 | |
| Percent Solids at time t = 30 | 14 | 17 | 16 | 15 |
| Percent Solids at time t = 60 | 19 | 21 | 22 | 21 |
| Percent Solids at time t = 90 | 25 | 27 | 26 | |
| Percent Solids at time t = 120 | 32 | 31 | 31 | 27 |
| Percent Solids at time t = 180 | 46 | 44 | 47 | 42 |
| Percent Solids at time t = 210 | 53 | 55 | 54 | 51 |
| Percent Solids at time t = 225 | 59 | 61 | 59 | |
| Percent Solids at time t = 240 | 63 | 65 | 63 | 65 |
| Melt Flow Rate (MFR) (g/10 min.) | 3.7 | 3.8 | 5 | 3.8 |
| GLOSS (percent) (average) | 85 | 82 | 85 | 89 |
| IZOD (J/M) | 29 | 35 | 35 | 28 |
| CHARPY (kJ/M$^2$) | 3.7 | 3.9 | 3.7 | 3.1 |
| Tensile Yield (Ty) (MPA) | 28 | 27 | 26 | 30 |
| Tensile Rupture (Tr) (MPA) | 23 | 23 | 21 | 25 |
| Elongation (percent) | 24 | 38 | 35 | 24 |
| E-Modulus (MPA) | 2050 | 2130 | 2090 | 2190 |
| Rubber particle size (microns) | 0.61 | 0.61 | 0.62 | 0.6 |
| Mineral Oil (percent) | 1.6 | 1.7 | 1.8 | 1.7 |
| Mz (× 1000) | 352 | 350 | 328 | 413 |
| Mw (× 1000) | 196 | 193 | 182 | 205 |
| Mn (× 1000) | 79 | 78 | 75 | 67 |
| Molecular Weight Distribution (Mw/Mn) | 2.47 | 2.47 | 2.43 | 3.05 |

*Control based on a 60 percent Butadiene 40 percent Styrene copolymer, not an example of the present invention.

The data from TABLE I indicates that a high gloss HIPS can be obtained using hydroperoxidized rubber with similar properties to that obtained from expensive block copolymers.

TABLE II

Grafting data for EXAMPLE 2

| Time (min.) | Solids (percent) | Total PB (mg) | Free Pb (mg) | Graft PB (mg) | Free PS (mg) | Graft PS (mg) | Percent GPS[1] | Percent GPBd[2] |
|---|---|---|---|---|---|---|---|---|
| 15 | 14 | 27.12 | 11.87 | 15.24 | 17.13 | 28.94 | 62.82 | 56.21 |
| 60 | 21 | 19.47 | 5.85 | 13.62 | 31.29 | 20.72 | 39.84 | 69.96 |
| 120 | 31 | 11.03 | 3.90 | 7.13 | 38.27 | 12.61 | 24.78 | 64.62 |
| 210 | 55 | 7.50 | 3.24 | 4.26 | 55.96 | 8.85 | 13.65 | 56.82 |

[1] Based on the total polystyrene.
[2] Based on the total polybutadiene.

TABLE III

Grafting data for EXAMPLE 3

| Time (min.) | Solids (Percent) | Total PB (mg) | Free PB (mg) | Graft PB (mg) | Free PS (mg) | Graft PS (mg) | Percent GPS[1] | Percent GPBD[2] |
|---|---|---|---|---|---|---|---|---|
| 15 | 14 | 28.34 | 10.43 | 17.91 | 15.53 | 27.45 | 63.86 | 63.19 |
| 60 | 22 | 20.31 | 6.72 | 13.59 | 31.28 | 21.37 | 40.59 | 66.92 |
| 120 | 31 | 11.64 | 3.86 | 7.78 | 37.82 | 11.7 | 23.64 | 66.84 |
| 210 | 54 | 7.12 | 3.1 | 4.02 | 53.61 | 8.15 | 13.19 | 56.48 |

[1] Based on the total polystyrene.
[2] Based on the total polybutadiene.

The grafting data shows that grafting levels at the point of inversion are in the range claimed. Phase inversion point is y at 2.5×the rubber level in feed. At 5.5 percent rubber, inversion is typically at approximately 14 percent conversion.

The Control and Example 2 are repeated and the resultant product is mixed with a large particle HIPS product having an average particle size of 3.5 microns to make bimodal HIPS with high gloss and impact properties.

TABLE IV

|  | 5* | 6 | 7* | 8 |
|---|---|---|---|---|
| HIPS containing small particles | Example 1 | Example 2 | Example 1 | Example 2 |
| Percent HIPS with Large Particles | 10 | 10 | 17 | 17 |
| MFR (g/10 min.) | 3.6 | 5.4 | 3.6 | 5.2 |
| Izod Impact (J/M) | 88 | 77 | 141 | 130 |
| Charpy Impact (kJ/M$^2$) | 10.3 | 8.9 | 11 | 10.2 |
| Average Gloss (percent) | 62 | 69 | 58 | 60 |
| Tensile Yield (MPA) | 25 | 25 | 25 | 24 |
| Tensile Rupture (MPA) | 21 | 21 | 22 | 21 |
| Elongation (percent) | 50 | 46 | 55 | 52 |
| Tensile Modulus (MPA) | 2025 | 2215 | 2080 | 2135 |

*Controls, not an example of the present invention.

The bimodal versions based on control block copolymer HIPS and HIPS of the present invention show similar properties.

What is claimed is:

1. A rubber modified polymer comprising
   a) a vinyl aromatic polymer matrix, and
   b) dispersed within the polymer matrix, a grafted rubber having a degree of grafting of from 30 to 100 percent at the point of phase inversion, wherein the total amount of grafted vinyl aromatic polymer is from 20 to 75 percent of the total amount of vinyl aromatic polymer.

2. The rubber modified polymer of claim 1 wherein the rubber is a diene rubber.

3. The rubber modified polymer of claim 2 wherein the rubber is a polybutadiene.

4. The rubber modified polymer of claim 1 wherein the dispersed rubber has an average particle size of from about 0.3 to about 1μ.

5. The rubber modified polymer of claim 4 wherein the dispersed rubber has a cellular morphology.

6. The rubber modified polymer of claim 4 wherein the dispersed rubber has a lamellar morphology.

7. The rubber modified polymer of claim 1 wherein the dispersed rubber has an average particle size of from about 0.1 to about 0.5μ.

8. The rubber modified polymer of claim 7 wherein the dispersed rubber has a core shell morphology.

9. The rubber modified polymer of claim 1 wherein the dispersed rubber is in the form of dense particles having an average particle size of less than 0.1μ.

10. The rubber modified polymer of claim 1 wherein the polymer additionally contains rubber particles having an average particle diameter of from about 1.5 to 10μ in an amount of from about 3 to about 50 percent by weight based on the total amount of rubber present.

11. A rubber modified polymer comprising
    a) a vinyl aromatic and unsaturated nitrile copolymer matrix, and
    b) dispersed within the polymer matrix, a grafted rubber having a degree of grafting of from 30 to 100 percent at the point of phase inversion, wherein the total amount of grafted vinyl aromatic and unsaturated nitrile copolymer is from 25 to 75 percent of the total amount of vinyl aromatic and unsaturated nitrile copolymer.

12. The rubber modified polymer of claim 11 wherein the rubber is a diene rubber.

13. The rubber modified polymer of claim 12 wherein the rubber is a polybutadiene.

14. The rubber modified polymer of claim 11 wherein the dispersed rubber has an average particle size of from about 0.3 to about 1μ.

15. The rubber modified polymer of claim 14 wherein the dispersed rubber has a cellular morphology.

16. The rubber modified polymer of claim 11 wherein the dispersed rubber is in the form of dense particles having an average particle size of from about 0.05 to about 0.2μ.

17. The rubber modified polymer of claim 11 wherein the dispersed rubber is in the form of dense particles having an average particle size of less than 0.1μ.

18. The rubber modified polymer of claim 11 wherein the dispersed rubber has a core shell morphology with an average particle size of 0.1 to 0.6μ.

19. The rubber modified polymer of claim 11 wherein the polymer additionally contains rubber particles having an average particle diameter of from about 1.1 to 5μ in an amount of from about 3 to about 50 percent by weight based on the total amount of rubber present.

20. A molded article produced from the rubber modified polymer of claim 1 or claim 11.

21. An extruded material produced from the rubber modified polymer of claim 1 or claim 11.

22. An improvement in a mass polymerization process for producing a rubber modified vinyl aromatic polymer wherein a vinyl aromatic monomer and rubber mixture is fed into a mass polymerization vessel and polymerized, the improvement comprising utilizing a grafting process such that at least 30 percent of the rubber is grafted with a grafting polymer at the point of phase inversion during the mass polymerization process.

23. The process of claim 22 wherein an ABS polymer is produced.

24. The process of claim 22 wherein the improvement comprises contacting the vinyl aromatic monomer and rubber mixture with singlet oxygen prior to polymerization such that hydroperoxide groups form on the rubber backbone.

25. The process of claim 22 wherein the singlet oxygen is generated from a phosphorus ozonide.

* * * * *